United States Patent
Gerber

(10) Patent No.: US 7,066,696 B2
(45) Date of Patent: Jun. 27, 2006

(54) DEVICE FOR THERMALLY SHRINKING TOOLS

(75) Inventor: Ernst Gerber, Relgoldswil (CH)

(73) Assignee: Rego-Fix AG, Tenniken (CH)

( * ) Notice: Subject to any disclaimer, the term of this patent is extended or adjusted under 35 U.S.C. 154(b) by 0 days.

(21) Appl. No.: 11/067,865

(22) Filed: Feb. 28, 2005

(65) Prior Publication Data

US 2005/0141978 A1 Jun. 30, 2005

Related U.S. Application Data

(63) Continuation of application No. 10/088,070, filed on Mar. 8, 2002, now Pat. No. 6,887,019.

(30) Foreign Application Priority Data

Sep. 16, 1999 (CH) ..................... 1699/99

(51) Int. Cl.
   *B23C 5/00* (2006.01)
   *B23B 31/117* (2006.01)
   *B23P 11/02* (2006.01)

(52) U.S. Cl. .............. 409/234; 408/239 A; 29/447; 279/102

(58) Field of Classification Search ............. 409/232, 409/234; 279/102; 29/447; 403/28–30, 403/273; 408/239 R, 238, 239 A
   See application file for complete search history.

(56) References Cited

U.S. PATENT DOCUMENTS

| 4,516,787 | A | 5/1985 | Venable |
| 4,759,110 | A | 7/1988 | Rieger et al. |
| 5,267,384 | A | 12/1993 | Teeslink |
| 5,277,435 | A | 1/1994 | Krämer et al. |
| 5,311,654 | A | 5/1994 | Cook |
| 6,234,729 | B1 * | 5/2001 | Cook ................. 408/226 |
| 6,260,858 | B1 | 7/2001 | DeLucia |
| 6,394,466 | B1 | 5/2002 | Matsumoto et al. |
| 6,519,829 | B1 | 2/2003 | Kuhlmann et al. |
| 6,595,528 | B1 | 7/2003 | Voss |
| 6,887,019 | B1 * | 5/2005 | Gerber ................. 409/234 |
| 2003/0075879 | A1 * | 4/2003 | Lundblad et al. ......... 279/102 |
| 2003/0132582 | A1 | 7/2003 | Hamier |
| 2005/0135893 | A1 * | 6/2005 | Voss et al. ............. 409/234 |

FOREIGN PATENT DOCUMENTS

| DE | 196 38 808 A1 | 3/1998 |
| EP | 1 029 620 A2 | 8/2000 |
| JP | 61-142024 | 6/1986 |
| JP | 61-219534 | 9/1986 |
| JP | 2-41807 | 2/1990 |
| JP | 09-253839 | 9/1997 |
| JP | 2002-120124 A * | 4/2002 |
| JP | 2002-283162 A * | 10/2002 |
| JP | 2003-500222 A * | 1/2003 |

OTHER PUBLICATIONS

ASM Handbook, vol. 20, Materials Selection and Design, George E. Dieter-Volume Chair, Dec. 1997, p. 279.

* cited by examiner

*Primary Examiner*—Erica Cadugan
(74) *Attorney, Agent, or Firm*—Hoffmann & Baron, LLP

(57) ABSTRACT

A heat shrink tool holder for holding tools and machine parts in an axial bore comprises a sleeve between the bore of the holder and the tool shank or machine part. The sleeve is a reducing sleeve that transfers a holding action exerted by the holder in its cold state to the tool shank or part. The sleeve is made of a material with a low thermal conductivity, like ceramic, and may be interchangeable or firmly fixed to the holder.

1 Claim, 1 Drawing Sheet

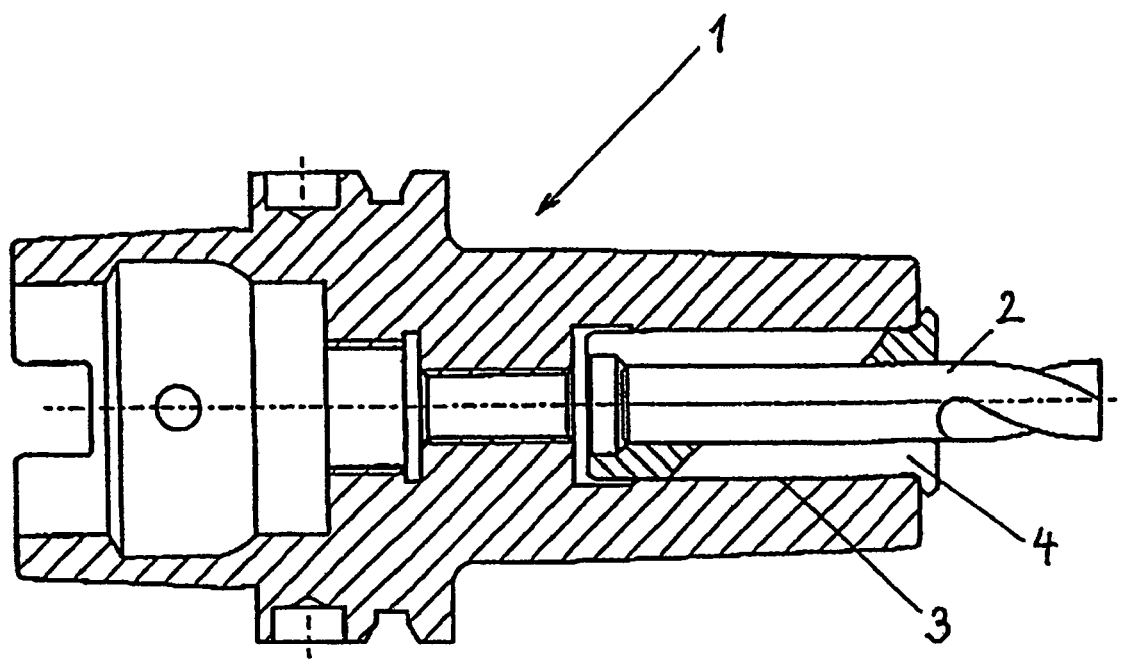

DEVICE FOR THERMALLY SHRINKING TOOLS

This application is a continuation of U.S. application Ser. No. 10/088,070, filed Mar. 8, 2002, now U.S. Pat. No. 6,887,019, which is a National Stage Application under Section 371 of PCT Application No. PCT/CH00/00501, filed Sep. 18, 2000, the contents of which are incorporated by reference herein.

The invention relates to a device for thermally shrinking and expanding tools and other machine parts in a holder.

It is known in the metalworking and woodworking industry thermally to shrink tools in a holder. This is done by heating the holder and then inserting the tool shank. On cooling, the holder closes around the shank to create a firm, high-precision tool-holding device.

To enable the shank to be removed (tool expansion), the holder must be made of a material which has a larger thermal expansion than the shank. For a shank made of hard metal with a coefficient of thermal expansion of $6.10^{-6}$, an example of a suitable holder is one made of steel, which has twice the thermal expansion. A steel shank would in turn require a holder made of an aluminum alloy with a coefficient of thermal expansion twice that of steel.

If the holder and the shank to be shrunk are made of materials with the same or approximately the same thermal expansion, it is still possible to shrink the shank because only the holder is heated in the shrinking process, the shank being cold. Tool expansion is normally no longer possible because, when the holder is heated, the good thermal conductivity of metals is such that the shrunk shank heats up and expands together with said holder.

Even for shrinking, the shank has to be introduced quickly because the heat transfers very rapidly from the holder to the shank due to the good thermal conductance of metals.

The smaller the bore of the holder, the smaller is the thermal expansion on heating and the more exacting are the work tolerances. For example, if the thermal expansion is 0.048 mm for a bore diameter of 20 mm, then for the same material it is only 0.0072 mm for a bore diameter of 3 mm.

DE-19638808-A1 discloses a tool holder in which the tool shank is shrunk not in the clamping chuck but in a collet chuck. The latter is conventionally inserted in the conical housing of the clamping chuck by means of tensioning nuts. This device suffers from the same problems between collet chuck and tool shank as do the conventional shrink chucks in which a tool shank is shrunk directly.

The object of the invention is to avoid these disadvantages associated with thermal shrinking.

This is achieved according to the invention by means of a sleeve inserted in the bore of the holder, said sleeve preferably being made of a material with a low thermal conductivity.

A preferred embodiment of the invention will be described below with the aid of the attached drawing.

The drawing is a sectional diagram of a tool holder 1 with an inserted tool 2, which in this case is a twist drill. The width of the bore 3 of the holder is approximately twice the diameter of the drill shank. A sleeve 4 is located between the drill 2 and the holder. The sleeve is provided with slits cut in from one end, or alternately from both ends, to assure a degree of elasticity. However, the slits can also be omitted, depending on the material and the wall thickness.

As stated, the material of the sleeve 4 preferably has a low thermal conductivity so that the heat transfer from the heated holder to the tool is substantially delayed.

If the sleeve material does not have an especially low thermal conductivity, tool shrinking and expansion are facilitated by the greater thermal expansion due to the larger diameter of the holder, the only condition being that heating takes place rapidly, as in the case of inductive heating.

Apart from a low thermal conductivity, however, the material must also have a sufficiently high strength, toughness and hardness to cope with the stresses applied. Certain ceramic materials, e.g. zirconium oxide ceramic, offer this combination of properties.

The sleeve can be inserted in the tool holder in a variety of ways. It can either be inserted in the holder as an interchangeable reducing sleeve or fixed firmly to the holder, e.g. by press-fitting, adhesion, screwing, etc.

The advantages of interchangeable sleeves are as follows: With a holder of specific bore diameter, the insertion of interchangeable reducing sleeves makes it possible to clamp tools with different shank diameters.

When the holder is heated, the greater thermal expansion of the bore of the holder is transferred linearly through the reducing sleeve to its smaller bore. In this way, tool shanks made of a material with the same coefficient of thermal expansion as the holder can be shrunk and also expanded again.

Another advantage is that the small bore diameters of the reducing sleeve do not have to be manufactured with such extremely small work tolerances.

If overstressing causes the tool shank to rotate in the housing, at worst the reducing sleeve, and not the holder, will be damaged.

What is claimed is:

1. Heat shrink tool holder for being inserted in a machine spindle and for holding a tool shank or machine part, the heat shrink tool holder comprising a body having an axial bore, and a sleeve fitting in the axial bore of the body, the sleeve having a second bore to fit onto and contact the tool shank or part, the second bore being generally cylindrical, wherein the sleeve is a reducing sleeve that transfers a holding action exerted by the body in its cold state to the tool shank or part, wherein the body has the same coefficient of thermal expansion as the tool shank or part.

* * * * *